(12) United States Patent
Lavoie et al.

(10) Patent No.: US 10,507,868 B2
(45) Date of Patent: Dec. 17, 2019

(54) TIRE PRESSURE MONITORING FOR VEHICLE PARK-ASSIST

(71) Applicant: Ford Global Technologies, LLC, Dearborn, MI (US)

(72) Inventors: Erick Michael Lavoie, Dearborn, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/902,680

(22) Filed: Feb. 22, 2018

(65) Prior Publication Data

US 2019/0256143 A1    Aug. 22, 2019

(51) Int. Cl.
  *B62D 15/02*    (2006.01)
  *B60C 23/04*    (2006.01)
  *G08G 1/16*     (2006.01)

(52) U.S. Cl.
  CPC .......... *B62D 15/0285* (2013.01); *B60C 23/04* (2013.01); *G08G 1/168* (2013.01); *B60T 2240/03* (2013.01)

(58) Field of Classification Search
  None
  See application file for complete search history.

(56) References Cited

U.S. PATENT DOCUMENTS

| | | |
|---|---|---|
| 5,959,724 A | 9/1999 | Izumi |
| 6,275,754 B1 | 8/2001 | Shimizu |
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |

(Continued)

FOREIGN PATENT DOCUMENTS

| | | |
|---|---|---|
| CN | 105774691 A | 7/1916 |
| CN | 101929921 A | 12/2010 |

(Continued)

OTHER PUBLICATIONS

US 9,772,406 B2, 09/2017, Liu (withdrawn)

(Continued)

*Primary Examiner* — Genna M Mott
*Assistant Examiner* — Melanie J Patrick
(74) *Attorney, Agent, or Firm* — Frank Lollo; Eversheds Sutherland (US) LLP

(57) ABSTRACT

Method and apparatus are disclosed for tire pressure monitoring for vehicle park-assist. An example vehicle includes tires, pressure sensors, and a controller. The controller is to identify a target position within a parking spot for park-assist, determine a tire index based on tire pressure measurements, and identify whether the tire index is within a low range, a caution range, or a normal operating range. The controller also is to adjust, responsive to the tire index being within the caution range, the target position to facilitate access to one of the tires having low pressure.

19 Claims, 7 Drawing Sheets

(56) References Cited

U.S. PATENT DOCUMENTS

| | | | |
|---|---|---|---|
| 6,801,855 B1 | 10/2004 | Walters | |
| 6,850,844 B1 | 1/2005 | Walters | |
| 6,850,148 B2 | 2/2005 | Masudaya | |
| 6,927,685 B2 | 8/2005 | Wathen | |
| 6,997,048 B2* | 2/2006 | Komatsu | B60C 23/0408 |
| | | | 73/146.2 |
| 7,042,332 B2 | 5/2006 | Takamura | |
| 7,123,167 B2 | 10/2006 | Staniszewski | |
| 7,307,655 B1 | 12/2007 | Okamoto | |
| 7,663,508 B2 | 2/2010 | Teshima | |
| 7,737,866 B2 | 6/2010 | Wu | |
| 7,813,844 B2 | 10/2010 | Gensler | |
| 7,825,828 B2 | 11/2010 | Watanabe | |
| 7,834,778 B2 | 11/2010 | Browne | |
| 7,847,709 B2 | 12/2010 | McCall | |
| 7,850,078 B2 | 12/2010 | Christenson | |
| 7,924,483 B2 | 4/2011 | Smith | |
| 8,035,503 B2 | 10/2011 | Partin | |
| 8,054,169 B2 | 11/2011 | Bettecken et al. | |
| 8,098,146 B2* | 1/2012 | Petrucelli | B60C 23/0401 |
| | | | 340/442 |
| 8,126,450 B2 | 2/2012 | Howarter | |
| 8,164,628 B2 | 4/2012 | Stein | |
| 8,180,524 B2 | 5/2012 | Eguchi | |
| 8,180,547 B2 | 5/2012 | Prasad | |
| 8,224,313 B2 | 7/2012 | Howarter | |
| 8,229,645 B2 | 7/2012 | Lee | |
| 8,242,884 B2 | 8/2012 | Holcomb | |
| 8,335,598 B2 | 12/2012 | Dickerhoof | |
| 8,401,235 B2 | 3/2013 | Lee | |
| 8,493,236 B2 | 7/2013 | Boehme | |
| 8,538,408 B2 | 9/2013 | Howarter | |
| 8,542,130 B2 | 9/2013 | Lavoie | |
| 8,552,856 B2 | 10/2013 | McRae | |
| 8,587,681 B2 | 11/2013 | Guidash | |
| 8,594,616 B2 | 11/2013 | Gusikhin | |
| 8,599,043 B2 | 12/2013 | Kadowaki | |
| 8,618,945 B2 | 12/2013 | Furuta | |
| 8,645,015 B2 | 2/2014 | Oetiker | |
| 8,655,551 B2 | 2/2014 | Danz | |
| 8,692,773 B2 | 4/2014 | You | |
| 8,706,350 B2 | 4/2014 | Talty | |
| 8,725,315 B2 | 5/2014 | Talty | |
| 8,742,947 B2 | 6/2014 | Nakazono | |
| 8,744,684 B2 | 6/2014 | Hong | |
| 8,780,257 B2 | 7/2014 | Gidon | |
| 8,787,868 B2 | 7/2014 | Leblanc | |
| 8,825,262 B2 | 9/2014 | Lee | |
| 8,933,778 B2 | 1/2015 | Birkel | |
| 8,957,786 B2 | 2/2015 | Stempnik | |
| 8,994,548 B2 | 3/2015 | Gaboury | |
| 8,995,914 B2 | 3/2015 | Nishidai | |
| 9,008,860 B2 | 4/2015 | Waldock | |
| 9,014,920 B1 | 4/2015 | Torres | |
| 9,078,200 B2 | 7/2015 | Wuergler | |
| 9,086,879 B2 | 7/2015 | Gautama | |
| 9,141,503 B1 | 9/2015 | Chen | |
| 9,147,065 B2 | 9/2015 | Lauer | |
| 9,154,920 B2 | 10/2015 | O'Brien | |
| 9,168,955 B2 | 10/2015 | Noh | |
| 9,193,387 B2 | 11/2015 | Auer | |
| 9,225,531 B2 | 12/2015 | Hachey | |
| 9,230,439 B2 | 1/2016 | Boulay | |
| 9,233,710 B2 | 1/2016 | Lavoie | |
| 9,273,966 B2 | 3/2016 | Bartels | |
| 9,275,208 B2 | 3/2016 | Protopapas | |
| 9,283,960 B1 | 3/2016 | Lavoie | |
| 9,286,803 B2 | 3/2016 | Tippelhofer | |
| 9,302,675 B2 | 4/2016 | Schilling | |
| 9,318,022 B2 | 4/2016 | Barth | |
| 9,379,567 B2 | 6/2016 | Kracker | |
| 9,381,859 B2 | 7/2016 | Nagata | |
| 9,429,657 B2 | 8/2016 | Sidhu | |
| 9,429,947 B1 | 8/2016 | Wengreen | |
| 9,454,251 B1 | 9/2016 | Guihot | |
| 9,469,247 B2 | 10/2016 | Juneja | |
| 9,493,187 B2 | 11/2016 | Pilutti | |
| 9,506,774 B2 | 11/2016 | Shutko | |
| 9,511,799 B2 | 12/2016 | Lavoie | |
| 9,522,675 B1 | 12/2016 | You | |
| 9,529,519 B2 | 12/2016 | Blumenberg | |
| 9,557,741 B1 | 1/2017 | Elie | |
| 9,563,990 B2 | 2/2017 | Khan | |
| 9,595,145 B2 | 3/2017 | Avery | |
| 9,598,051 B2 | 3/2017 | Okada | |
| 9,606,241 B2 | 3/2017 | Varoglu | |
| 9,616,923 B2 | 4/2017 | Lavoie | |
| 9,637,117 B1 | 5/2017 | Gusikhin | |
| 9,651,655 B2 | 5/2017 | Feldman | |
| 9,656,690 B2 | 5/2017 | Shen | |
| 9,666,040 B2 | 5/2017 | Flaherty | |
| 9,688,306 B2 | 6/2017 | McClain | |
| 9,701,280 B2 | 7/2017 | Schussmann | |
| 9,712,977 B2 | 7/2017 | Tu | |
| 9,715,816 B1 | 7/2017 | Adler | |
| 9,725,069 B2 | 8/2017 | Krishnan | |
| 9,731,714 B2 | 8/2017 | Kiriya | |
| 9,731,764 B2 | 8/2017 | Baek | |
| 9,754,173 B2 | 9/2017 | Kim | |
| 9,809,218 B2 | 11/2017 | Elie | |
| 9,811,085 B1 | 11/2017 | Hayes | |
| 9,842,444 B2 | 12/2017 | Van Wiemeersch | |
| 9,845,070 B2 | 12/2017 | Petel | |
| 9,846,431 B2 | 12/2017 | Petel | |
| 9,914,333 B2 | 3/2018 | Shank | |
| 9,921,743 B2 | 3/2018 | Bryant | |
| 9,946,255 B2 | 4/2018 | Matters | |
| 9,959,763 B2 | 5/2018 | Miller | |
| 9,971,130 B1 | 5/2018 | Lin | |
| 9,975,504 B2 | 5/2018 | Dalke | |
| 10,019,001 B2 | 7/2018 | Dang Van Nhan | |
| 10,032,276 B1 | 7/2018 | Liu | |
| 10,040,482 B1 | 8/2018 | Jung | |
| 10,043,076 B1 | 8/2018 | Zhang | |
| 10,131,347 B2 | 11/2018 | Kim | |
| 10,192,113 B1 | 1/2019 | Liu | |
| 10,246,055 B2 | 4/2019 | Farges | |
| 10,268,341 B2 | 4/2019 | Kocienda | |
| 2003/0060972 A1 | 3/2003 | Kakinami | |
| 2003/0098792 A1 | 5/2003 | Edwards | |
| 2003/0133027 A1 | 7/2003 | Itoh | |
| 2005/0030156 A1 | 2/2005 | Alfonso | |
| 2005/0068450 A1 | 3/2005 | Steinberg | |
| 2005/0099275 A1 | 5/2005 | Kamdar | |
| 2006/0010961 A1* | 1/2006 | Gibson | B60C 23/0408 |
| | | | 73/40 |
| 2006/0227010 A1 | 10/2006 | Berstis | |
| 2006/0235590 A1 | 10/2006 | Bolourchi | |
| 2007/0230944 A1 | 10/2007 | Georgiev | |
| 2008/0027591 A1 | 1/2008 | Lenser | |
| 2008/0154464 A1 | 6/2008 | Sasajima | |
| 2008/0154613 A1 | 6/2008 | Haulick | |
| 2008/0238643 A1 | 10/2008 | Malen | |
| 2008/0306683 A1 | 12/2008 | Ando | |
| 2009/0096753 A1 | 4/2009 | Lim | |
| 2009/0098907 A1 | 4/2009 | Huntzicker | |
| 2009/0115639 A1 | 5/2009 | Proefke | |
| 2009/0125181 A1 | 5/2009 | Luke | |
| 2009/0125311 A1 | 5/2009 | Haulick | |
| 2009/0128315 A1 | 5/2009 | Griesser | |
| 2009/0146813 A1 | 6/2009 | Nuno | |
| 2009/0174574 A1* | 7/2009 | Endo | B60R 1/00 |
| | | | 340/932.2 |
| 2009/0241031 A1 | 9/2009 | Gamaley | |
| 2009/0289813 A1 | 11/2009 | Kwiecinski | |
| 2009/0309970 A1 | 12/2009 | Ishii | |
| 2009/0313095 A1 | 12/2009 | Hurpin | |
| 2010/0025942 A1 | 2/2010 | Von Rehyer | |
| 2010/0061564 A1 | 3/2010 | Clemow | |
| 2010/0114471 A1 | 5/2010 | Sugiyama | |
| 2010/0114488 A1 | 5/2010 | Khamharn | |
| 2010/0136944 A1 | 6/2010 | Taylor | |
| 2010/0152972 A1 | 6/2010 | Attard | |
| 2010/0156672 A1 | 6/2010 | Yoo | |

(56) References Cited

U.S. PATENT DOCUMENTS

| | | |
|---|---|---|
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1* | 2/2013 | Niemz ............... B62D 5/0496 340/438 |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |

(56) References Cited

U.S. PATENT DOCUMENTS

| | | |
|---|---|---|
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 103818204 A | 5/2014 |
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009051055 A1 | 7/2010 |
| DE | 102009024083 A1 | 12/2010 |
| DE | 102009060169 A1 | 6/2011 |
| DE | 102012008858 A1 | 11/2012 |
| DE | 102011080148 A1 | 1/2013 |
| DE | 102011122421 A1 | 6/2013 |
| DE | 102012200725 A1 | 7/2013 |
| DE | 102013004214 A1 | 9/2013 |
| DE | 102010034129 B4 | 10/2013 |
| DE | 102012215218 A1 | 6/2014 |
| DE | 102012222972 A1 | 6/2014 |
| DE | 102013213064 A1 | 1/2015 |
| DE | 102014009077 A1 | 2/2015 |
| DE | 102013016342 A1 | 4/2015 |
| DE | 102013019771 A1 | 5/2015 |
| DE | 102013019904 A1 | 5/2015 |
| DE | 102014007915 A1 | 12/2015 |
| DE | 102014011802 A1 | 2/2016 |
| DE | 102014011864 A1 | 2/2016 |
| DE | 102014111570 A1 | 2/2016 |
| DE | 102014015655 A1 | 4/2016 |
| DE | 102014226458 A1 | 6/2016 |
| DE | 102015209976 A1 | 12/2016 |
| DE | 102015221224 A1 | 5/2017 |
| DE | 102016011916 A1 | 6/2017 |
| DE | 102016125282 A1 | 7/2017 |
| DE | 102016211021 A1 | 12/2017 |
| DE | 102016214433 A1 | 2/2018 |
| DE | 102016224529 A1 | 6/2018 |
| DE | 102016226008 A1 | 6/2018 |
| EP | 2289768 A2 | 3/2011 |
| EP | 2295281 A1 | 3/2011 |
| EP | 2653367 A1 | 10/2013 |
| EP | 2768718 B1 | 3/2016 |
| EP | 2620351 B1 | 6/2016 |
| EP | 2135788 B1 | 6/2017 |
| FR | 3021798 A1 | 12/2015 |
| GB | 2344481 A | 6/2000 |
| GB | 2481324 A | 6/2011 |
| GB | 2491720 A | 12/2012 |
| GB | 2497836 A | 12/2012 |
| GB | 2517835 A | 3/2015 |
| GB | 2534471 A | 7/2016 |
| JP | 2000293797 A | 10/2000 |
| JP | 2004142543 A | 5/2004 |
| JP | 2004287884 A | 10/2004 |
| JP | 2005193742 A | 7/2005 |
| JP | 2009090850 A | 4/2009 |
| JP | 2014125196 A | 7/2014 |
| JP | 2014134082 A | 7/2014 |
| JP | 5586450 B2 | 9/2014 |
| JP | 5918683 B2 | 5/2016 |
| JP | 2016119032 A | 6/2016 |
| JP | 2018052188 A | 4/2018 |
| KR | 20160039460 A | 4/1916 |
| KR | 20090040024 A | 4/2009 |
| KR | 20100006714 A | 1/2010 |
| KR | 20130106005 A | 9/2013 |
| KR | 20160051993 A | 5/2016 |
| KR | 10164167 B | 7/2016 |
| WO | WO 2006/064544 A1 | 6/2006 |
| WO | WO 2008/055567 A1 | 5/2008 |
| WO | WO 2010/006981 A1 | 1/2010 |
| WO | WO 2011/141096 A1 | 11/2011 |
| WO | WO 2013/056959 A1 | 4/2013 |
| WO | WO 2013/123813 A1 | 8/2013 |
| WO | WO 2014/103492 A1 | 7/2014 |
| WO | WO 2015/068032 A1 | 5/2015 |
| WO | WO 2015/193058 A1 | 12/2015 |
| WO | WO 2016/046269 A1 | 3/2016 |
| WO | WO 2016/128200 A1 | 8/2016 |
| WO | WO 2016/134822 A1 | 9/2016 |
| WO | WO 2017/062448 A1 | 4/2017 |
| WO | WO 2017/073159 A1 | 5/2017 |
| WO | WO 2017/096307 A1 | 6/2017 |
| WO | WO 2017/096728 A1 | 6/2017 |
| WO | WO 2017/097942 A1 | 6/2017 |
| WO | WO 2017/112444 A1 | 6/2017 |
| WO | WO 2017/118510 A1 | 7/2017 |
| WO | WO 2017/125514 A1 | 7/2017 |

OTHER PUBLICATIONS

Land Rover develops a smartphone remote control for its SUVs, James Vincent, Jun. 18, 2015.

Al-Sherbaz, Ali et al., Hybridisation of GNSS with other wireless/sensors technologies on board smartphones to offer seamless outdoors-indoors positioning for LBS applications, Apr. 2016, 3 pages.

Jingbin Liu, IParking: An Intelligent Indoor Location-Based Smartphone Parking Service, Oct. 31, 2012, 15 pages.

Alberto Broggi and Elena Cardarelli, Vehicle Detection for Autonomous Parking Using a Soft-Cascade ADA Boost Classifier, Jun. 8, 2014.

(56) References Cited

OTHER PUBLICATIONS

Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
Core System Requirements Specification (SyRS), Jun. 30, 2011, Research and Innovative Technology Administration.
Daimler AG, Remote Parking Pilot, Mar. 2016 (3 Pages).
Perpendicular Parking—https://prezi.com/toqmfyxriksl/perpendicular-parking/.
Search Report dated Jan. 19, 2018 for GB Patent Application No. 1711988.4 (3 pages).
Search Report dated Jul. 11, 2017 for GB Patent Application No. Enter U.S. Appl. No. 15/583,524, pp. 3.
Search Report dated May 21, 2018 for Great Britain Patent Application No. GB 1800277.4 (5 Pages).
Search Report dated Nov. 28, 2017, for GB Patent Application No. GB 1710916.6 (4 Pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.
ChargeItSpot Locations, Find a Phone Charging Station Near You, retrieved at https://chargeitspot.com/locations/ on Nov. 28, 2017.
Land Rover, Land Rover Remote Control via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
SafeCharge, Secure Cell Phone Charging Stations & Lockers, retrieved at https://www.thesafecharge.com on Nov. 28, 2017.
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2018 for GB Patent Application No. GB 1809842.6 (5 pages).

\* cited by examiner

TIRE PRESSURE MONITORING FOR VEHICLE PARK-ASSIST

TECHNICAL FIELD

The present disclosure generally relates to vehicle park-assist and, more specifically, to tire pressure monitoring for vehicle park-assist.

BACKGROUND

Many vehicles include motive functions that are at least partially autonomously controlled by the vehicle. For instance, some vehicles include cruise control in which the vehicle controls acceleration and/or deceleration of the vehicle so that a speed of the vehicle is maintained. Some vehicles also include park-assist features in which the vehicle autonomously controls motive functions of the vehicle to park the vehicle into a parking spot. Moreover, some vehicles have implemented tire pressure monitoring systems (TPMS sensors) that monitor tire pressures and/or other characteristics of the tires. For instance, a vehicle may include a tire pressure sensor for each tire of the vehicle to enable each of the tires to be monitored.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for tire pressure monitoring for vehicle park-assist. An example disclosed vehicle includes tires, pressure sensors, and a controller. The controller is to identify a target position within a parking spot for park-assist, determine a tire index based on tire pressure measurements, and identify whether the tire index is within a low range, a caution range, or a normal operating range. The controller also is to adjust, responsive to the tire index being within the caution range, the target position to facilitate access to one of the tires having low pressure.

In some examples, the controller disables the park-assist responsive to identifying that the tire index is within the low range. In such examples, the tire index is within the low range when one or more of the tires has a low tire pressure that prevents the park-assist from being performed within the parking spot.

In some examples, the controller enables the park-assist responsive to identifying that the tire index is within the normal operating range. In such examples, the tire index is within the normal operating range when the tires have tire pressures that enable the park-assist to be performed within the parking spot. In some such examples, the tire index is within the normal operating range when each of the tires has a tire pressure that is within a factory-recommended tire pressure range.

In some examples, the controller reduces the tire index in response to detecting that one or more of the tires has a low tire pressure or a high tire pressure. In some such examples, the controller further reduces the tire index in response to detecting that one or more of the tires is flat. In some such examples, the controller further reduces the tire index in response to detecting that the one or more of the tires having the low tire pressure or the high tire pressure is a steering tire. In some examples, the controller reduces the tire index in response to detecting that one of the tires has a lower tire pressure than the other of the tires.

Some examples further include at least one of a sensor and a camera. In such examples, the controller identifies the parking spot and the target position within the parking spot based on at least one of data collected by the sensor and an image captured by the camera. Some examples further include a communication module configured to wirelessly communicate with a mobile device for remote park-assist. Some examples further include a display that is configured to present a park-assist interface.

In some examples, a park-assist interface includes a tire index alert that indicates whether the tire index is within the low range, the caution range, or the normal operating range. In some examples, when the tire index is within the caution range, a park-assist interface prompts a user to select whether to stop or proceed with the park-assist. In some examples, a park-assist interface presents the tire pressure measurements of the tires. In some examples, a park-assist interface presents a representation of the parking spot and the target position within the parking spot.

In some examples, to compensate for a low tire pressure or a high tire pressure of one or more of the tires upon identifying that the tire index is within the caution range, the controller is configured to at least one of increase a buffer zone within the parking spot, decrease a vehicle speed for the park-assist, and adjust PID controller gains utilized to perform the park-assist. In some such examples, upon identifying that the tire index is within the caution range, the controller stops performing the park-assist responsive to determining that a vehicle trajectory will enter the buffer zone.

An example disclosed method includes identifying, via a processor, a target position within a parking spot for park-assist. The example disclosed method also includes collecting tire pressure measurements via pressure sensors, determining a tire index based on the tire pressure measurements, and identifying whether the tire index is within a low range, a caution range, or a normal operating range. The example disclosed method also includes adjusting, when the tire index is within the caution range, the target position to facilitate access to a tire having low pressure.

Some examples further include disabling, via the processor, the park-assist responsive to identifying that the tire index is within the low range. In such examples, the tire index is within the low range when one or more tires has a low tire pressure that prevents the park-assist from being performed within the parking spot. Some examples further include enabling, via the processor, the park-assist responsive to identifying that the tire index is within the normal operating range. In such examples, the tire index is within the normal operating range when the tire pressure measurements indicate vehicle tires are able to perform the park-assist within the parking spot.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
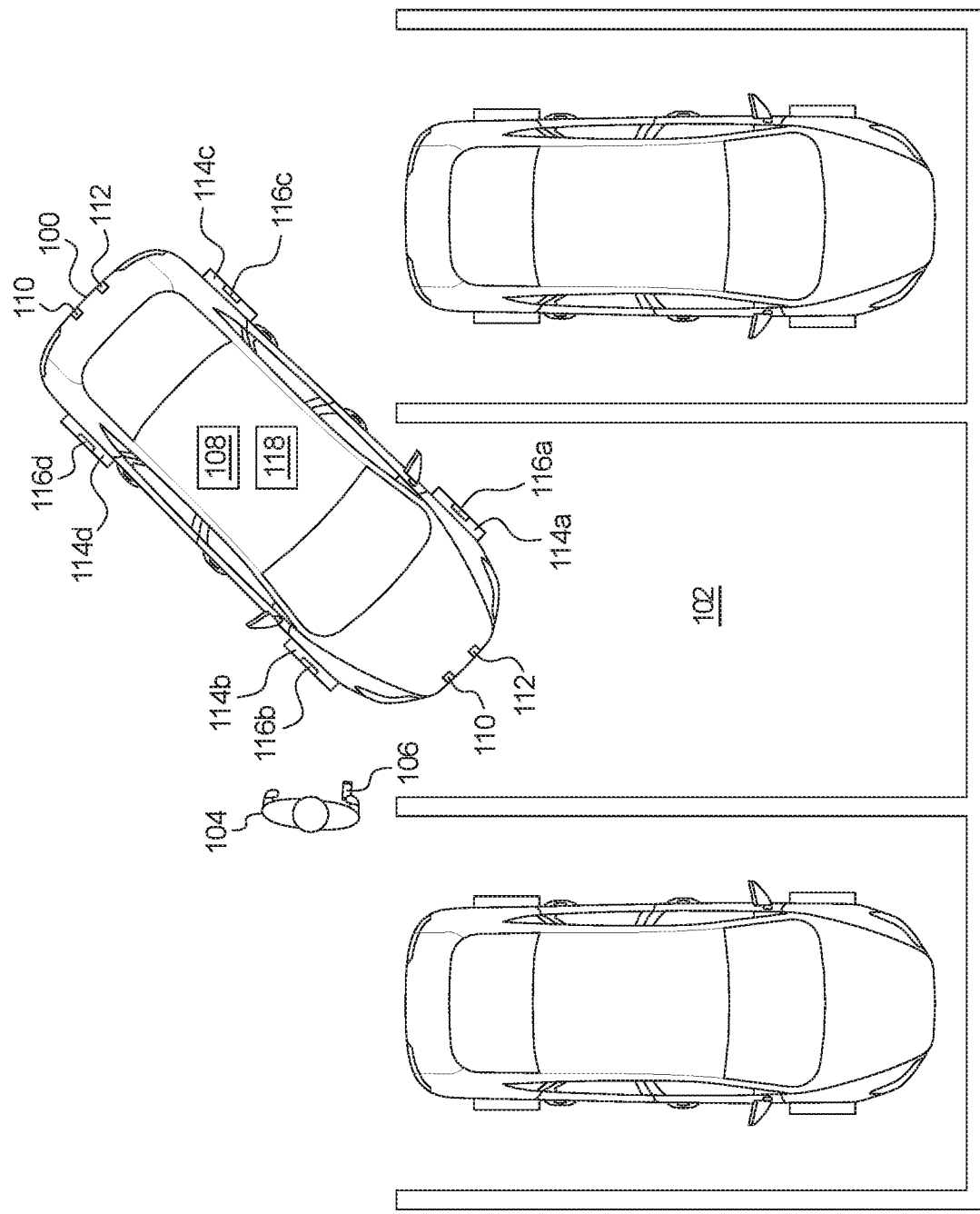
FIG. 1 illustrates an example of a vehicle utilizing park-assist in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles typically include tires that are coupled to respective wheel rims. Generally, the tires are formed of rubber (e.g., synthetic rubber, natural rubber), fabric, wiring, and/or other materials and chemical compounds. Recently, vehicles have implemented tire pressure monitoring systems (TPMS sensors) that monitor tire pressures and/or other characteristics of the tires. For instance, a vehicle may include a tire pressure sensor for each tire of the vehicle to enable each of the vehicles to be monitored.

Further, many vehicles include motive functions that are at least partially autonomously controlled by the vehicle. Some vehicles include cruise control in which the vehicle controls acceleration and/or deceleration of the vehicle so that a speed of the vehicle is maintained. Further, some vehicles include park-assist features in which the vehicle autonomously controls motive functions of the vehicle to park the vehicle into a parking spot. For instance, some vehicles utilize remote park-assist systems that are configured to enable a vehicle operator (e.g., a driver) to remotely initiate the vehicle to autonomously park itself from a position outside a cabin of the vehicle. In some instances, characteristics of tires of the vehicle, such as tire pressure and tread levels, may potentially affect handling of the vehicle as the vehicle performs (remote) park-assist functions.

Example methods and apparatus disclosed herein enable a vehicle having tire(s) with low pressure to reliably autonomously park into a parking spot by (i) measuring tire pressures of tires of a vehicle, (ii) determining whether park-assist features (e.g., remote park-assist features) will be affected based upon the measured tire pressures of the vehicle, and (iii) adjusting functionality of one or more of the park-assist features based upon that determination. Examples disclosed herein include a system for adjusting performance of park-assist features (e.g., remote park-assist features) of a vehicle based upon measurements of tire characteristics collected from a tire pressure measurement system (TPMS) sensor. The system determines whether the measured tire characteristics (e.g., tire pressure) will affect performance of the park-assist functions. If one or more of tire characteristics (e.g., low tire pressure) prevents performance of the park-assist functions, the system at least temporarily disables the park-assist functions of the vehicle. If the measured tire characteristics affect, but do not prevent, performance of the park-assist functions, the system adjusts the one or more of the park-assist functions based upon the measured tire characteristics. For example, to compensate for low pressure measurements of one or more of the tires of the vehicle, the system (i) adjusts a target position and/or orientation of the vehicle within an available parking spot, (ii) adjusts a travel path into and/or from the parking spot, (iii) increases a park-assist buffer zone within the parking spot, (iv) decreases a vehicle speed during performance of park-assist motive functions, and/or (v) adjusts controller gains (e.g., proportional-integral-derivative (PID) controller gains) utilized to perform the park-assist features. Further, the system utilizes a display (e.g., a vehicle display, a mobile device display) to present the tire pressure measurements, an availability status of the park-assist functions, and/or selectable options for performance of the park-assist functions.

As used herein, "park-assist" and "vehicle park-assist" refer to a system in which a vehicle operator (e.g., a driver) initiates a vehicle to perform motive functions, without receiving direct steering or velocity input from a driver, to autonomously park the vehicle into a parking spot. For example, the vehicle operator may initiate the vehicle to perform the motive functions for autonomously parking from within and/or outside of a cabin of the vehicle. As used herein, "remote parking," "vehicle remote park-assist," "remote park-assist," and "RePA" refer to a system in which a remote device of a vehicle operator (e.g., a driver) initiates a vehicle to perform motive functions, without receiving direct steering or velocity input from a driver, to autonomously park the vehicle into a parking spot while the vehicle operator is located outside of the vehicle. That is, a remote park-assist system initiates motive functions of a vehicle to remotely park the vehicle into a parking spot upon receiving instructions from a remote device of a vehicle operator.

Turning to the figures, FIG. 1 illustrates an example vehicle 100 in accordance with the teachings herein. In the illustrated examples, the vehicle 100 is utilizing remote park-assist features to park into a parking spot 102. A user 104 utilizes a mobile device 106 (e.g., a smart phone, a wearable, a smart watch, a tablet, a fob, etc.) to initiate the remote park-assist features of the vehicle 100.

The vehicle 100 of the illustrated example may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input).

In the illustrated example, the vehicle 100 includes a vehicle communication module 108 that includes wired or wireless network interfaces to enable communication with other devices (e.g., the mobile device 106) and/or external networks. The external network(s) may be a public network, such as the Internet; a private network, such as an intranet; or combinations thereof, and may utilize a variety of networking protocols now available or later developed including, but not limited to, TCP/IP-based networking protocols. Further, the vehicle communication module 108 includes hardware (e.g., processors, memory, storage, antenna, etc.) and software to control the wired or wireless network interfaces. For example, the vehicle communication module 108 includes a wired or wireless interface (e.g., an auxiliary port, a Universal Serial Bus (USB) port, a Bluetooth® wireless node, etc.) to communicatively couple with the mobile device 106 of the user 104. In such examples, the vehicle 100 may communicate with an external network via the mobile device 106. In some examples, the vehicle communication module 108 includes one or more communication controllers for cellular networks, such as Global System for Mobile Communications (GSM), Universal Mobile Telecommunications System (UMTS), Long Term Evolution (LTE), Code Division Multiple Access (CDMA). In the illustrated example, the vehicle communication module 108 includes a wireless personal area network (WPAN) module that is configured to wirelessly communicate with the mobile device 106 of the user 104 via short-range wireless communication protocol(s). In some examples, the vehicle communication module 108 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the mobile device communication module 606 is configured to wirelessly communicate via Wi-Fi®, Near Field Communication (NFC), UWB (Ultra-Wide Band), and/or any other short-range and/or local wireless communication protocol (e.g., IEEE 802.11 a/b/g/n/ac) that enables the mobile device communication module 606 to communicatively couple to the mobile device 106 of the user 104.

As illustrated in FIG. 1, the vehicle 100 also includes proximity sensors 110 and cameras 112. For example, the proximity sensors 110 are configured to collect data that are utilized to detect and locate nearby objects within the surrounding area of the vehicle 100. The proximity sensors 110 include radar sensor(s) that detect and locate objects via radio waves, LIDAR sensor(s) that detect and locate objects via lasers, ultrasonic sensor(s) that detect and locate objects via ultrasound waves, and/or any other sensor(s) that are able to detect and locate nearby objects. Further, the cameras 112 are configured to capture image(s) and/or video of an area surrounding the vehicle 100 that are utilized to detect and locate nearby objects (e.g., the parking spot 102). In the illustrated example, one of the proximity sensors 110 and one of the cameras 112 are front sensing devices that monitor an area in front of the vehicle 100. Additionally, one of the proximity sensors 110 and one of the cameras 112 are rear sensing devices that monitor an area behind the vehicle 100.

The vehicle 100 of the illustrated example also includes tires 114 and pressure sensors 116 (e.g., tire pressure management system (TPMS) sensors). For example, the tires 114 are coupled to respective wheel rims of the vehicle 100. In some examples, the tires 114 are formed of rubber (e.g., synthetic rubber, natural rubber), fabric, wiring, and/or other materials and chemical compounds that reduce wear-and-tear of the wheels, improve handling, and/or affect other vehicle characteristics (e.g., fuel economy) during operation of the vehicle 100. Further, in some examples, the tires 114 include treads (i.e., grooved patterns) on their outer surfaces to further improve handling during operation of the vehicle 100. Further, the pressure sensors 116 of the illustrated example include circuitry configured to determine tire pressures and/or other characteristics of the tires 114. For example, each of the pressure sensors 116 include and/or are communicatively coupled to one or more processors and/or memory. Further, each of the pressure sensors 116 includes circuitry to facilitate wireless communication with the vehicle communication module 108 of the vehicle 100. In the illustrated example, the vehicle 100 includes a tire 114*a* (e.g., a first tire, a front driver-side tire) that is monitored by a pressure sensor 116*a* (e.g., a first pressure sensor, a front driver-side pressure sensor), a tire 114*b* (e.g., a second tire, a front passenger-side tire) that is monitored by a pressure sensor 116*b* (e.g., a second pressure sensor, a front passenger-side pressure sensor), a tire 114*c* (e.g., a third tire, a rear driver-side tire) that is monitored by a pressure sensor 116*c* (e.g., a third pressure sensor, a rear driver-side pressure sensor), and a tire 114*d* (e.g., a fourth tire, a rear passenger-side tire) that is monitored by a pressure sensor 116*d* (e.g., a rear pressure sensor, a rear driver-side pressure sensor).

As illustrated in FIG. 1, the vehicle 100 includes a park-assist controller 118 that is utilized to control park-assist features of the vehicle 100. In operation, the park-assist controller 118 identifies the parking spot 102 near the vehicle 100 based upon data collected by the proximity sensors 110 and/or image(s) and/or video captured by the cameras 112. Further, the park-assist controller 118 identifies one or more target positions to park the vehicle 100 within the parking spot 102. For example, the park-assist controller 118 identifies the target position(s) based upon the characteristics of the vehicle 100 (e.g., size, current location, minimum turning radius, characteristics of the vehicle 100 (e.g., identified via the data collected by the proximity sensors 110 and/or the image(s) and/or video captured by the cameras 112), and/or characteristics of a surrounding environment (e.g., other nearby objects such as parked vehicles).

Further, the park-assist controller 118 of the vehicle 100 collects tire pressure measurements of the tires 114 via the pressure sensors 116. For example, the park-assist controller 118 is configured to collect a first tire pressure measurement from the pressure sensor 116*a* and associate the first tire pressure measurement with the tire 114*a*; collect a second tire pressure measurement from the pressure sensor 116*b* and associate the second tire pressure measurement with the tire 114*b*; collect a third tire pressure measurement from the pressure sensor 116*c* and associate the third tire pressure measurement with the tire 114*c*; and collect a fourth tire pressure measurement from the pressure sensor 116*d* and associate the fourth tire pressure measurement with the tire 114*d*.

Based on the tire pressure measurements of the tires 114, the park-assist controller 118 determines a tire index for the vehicle 100. The tire index represents the effect that the tire pressure measurements of the tires 114 will have on the reliable performance of park-assist features by the vehicle 100. For example, the vehicle 100 is able to reliably perform the park-assist features when each of the tires 114 has a pressure within the factory-recommended range and/or another predefined tire pressure range. The vehicle 100 potentially may be unable to reliably perform the park-assist features when one or more of the tires 114 has a high tire pressure, a low tire pressure and/or is flat. For example, a low tire pressure and/or high tire pressure may affect the precision of the driving maneuvers of the vehicle and, in turn, potentially impede the vehicle 100 in reliably parking the vehicle 100 via park-assist features.

In the illustrated example, the park-assist controller 118 increases the tire index when more of the tires 114 have tire pressures within the factory-recommended range and/or another predefined tire pressure range. The park-assist controller 118 decreases the tire index when one or more of the tires has a low tire pressure that is below the predefined range (e.g., the factory-recommended range) and/or a high tire pressure that is above the predefined range (e.g., the factory-recommended range). In some examples, the park-assist controller 118 is configured to further reduce the tire index in response to detecting that one or more of the tires 114 is flat. Further, in some examples, the park-assist controller 118 is configured to further reduce the tire index in response to detecting that one or more of the tires 114 having a low tire pressure and/or high tire pressure is a steering tire (e.g., a front tire for a front-wheel drive vehicle, a rear tire for a rear-wheel drive vehicle). Additionally or alternatively, the park-assist controller 118 is configured to reduce the tire index in response to detecting that three of the tires 114 has substantially similar tire pressure (e.g., 35 pounds per square inch (PSI)) and the other of the tires 114 has a substantially lower tire pressure (e.g., 27 PSI).

Upon determining the tire index of the vehicle 100, the park-assist controller 118 identifies whether the tire index is within a low range, a caution range, or a normal operating range. For example, the park-assist controller 118 identifies that the tire index is within the normal operating range when the tires 114 have tire pressures that enable the park-assist features to be reliably performed within and/or outside of the parking spot 102. For example, the tire index is within the normal operating range when each of the tires 114 has a tire pressure within the factory-recommended tire pressure range. Additionally or alternatively, the tire index is within the normal operating range when each of the tires 114 has a tire pressure within another predefined tire pressure range. In some examples, because the park-assist motive functions are performed at low speeds, a predefined tire pressure range that corresponds with the normal operating range extends beyond the factory-recommended tire pressure range (e.g., that are defined, at least in part, based upon tire characteristics at high speeds). In response to determining that the tire index is within the normal operating range, the park-assist controller 118 enables the park-assist features to be initiated by the user 104. Further, the park-assist controller 118 identifies that the tire index is within the low range when one or more of the tires 114 has a low tire pressure (e.g., is flat) that prevents the park-assist features from reliably being performed within and/or outside of the parking spot 102. In response to determining that the tire index is within the low range, the park-assist controller 118 disables the park-assist features to prevent the user 104 from initiating park assist for the vehicle 100.

The park-assist controller 118 of the illustrated example identifies that the tire index is within the caution range when one or more of the park-assist features are unable to be performed reliably due to the low tire pressure of one or more of the tires 114. For example, the park-assist controller 118 identifies that the tire index is within the caution range when one or more of the tires 114 has a low tire pressure that is below a predefined range (e.g., a factory-recommended tire pressure range) and/or a high tire pressure that is above the predefined range (e.g., the factory-recommended tire pressure range). In response to determining that the tire index is within the caution range, the park-assist controller 118 enables the user 104 to select whether to stop or proceed with performance of the park-assist features. If the user 104 selects to proceed with park assist of the vehicle 100, the park-assist controller 118 limits and/or adjusts the performance of one or more of the park-assist features. To compensate for the low tire pressure and/or high tire pressure, the park-assist controller 118 is configured to adjust a target position and/or a target orientation of the vehicle 100 within the parking spot 102. For example, the park-assist controller 118 adjusts the target position and/or target orientation to facilitate access to one or more of the tires 114 with low tire pressure and/or high tire pressure when the vehicle 100 is parked within the parking spot 102. For example, if the tire 114a has low pressure, the park-assist controller 118 shifts the target parking spot toward the opposing side of the parking spot 102 and/or instructs the vehicle 100 to enter the parking spot 102 in reverse to provide the user 104 with space to observe and/or service the tire 114a when the vehicle 100 is parked. Additionally or alternatively, the park-assist controller 118 is configured to compensate for the low tire pressure and/or high tire pressure by (i) adjusting a target travel path into the parking spot 102, (ii) increases a buffer zone within the parking spot 102, (iii) decrease a speed at which the vehicle 100 moves during the park-assist maneuvers, and/or (iv) adjusts controller gains (e.g., PID controller gains) utilized to control the park-assist features. Further, in some examples, the park-assist controller 118 is configured to stop performing the park-assist maneuvers when the tire index is in the caution range in response to determining that a trajectory of the vehicle 100 will enter a buffer zone within the parking spot 102 and/or the vehicle 100 is otherwise unable to reliably perform the park-assist features.

Additionally or alternatively, the park-assist controller 118 is configured to perform park-assist features based on the tire pressure measurements to enable the vehicle 100 to exit the parking spot 102. For example, when the vehicle 100 is parked in the parking spot 102, the park-assist controller 118 collects the tire pressure measurements from the pressure sensors 116 and determines the tire index based upon the tire pressure measurements. In response to determining that the tire index is within the normal operating range, the park-assist controller 118 enables the vehicle 100 to perform the park-assist features to exit the parking spot 102. In response to determining that the tire index is within the low range, the park-assist controller 118 disables the park-assist features to prevent the vehicle 100 from exiting the parking spot 102 via park assist. Further, in response to determining that the tire index is within the caution range, the park-assist controller 118 limits and/or adjusts one or more of the park-assist features as the vehicle 100 exits the parking spot 102.

Figure 2:
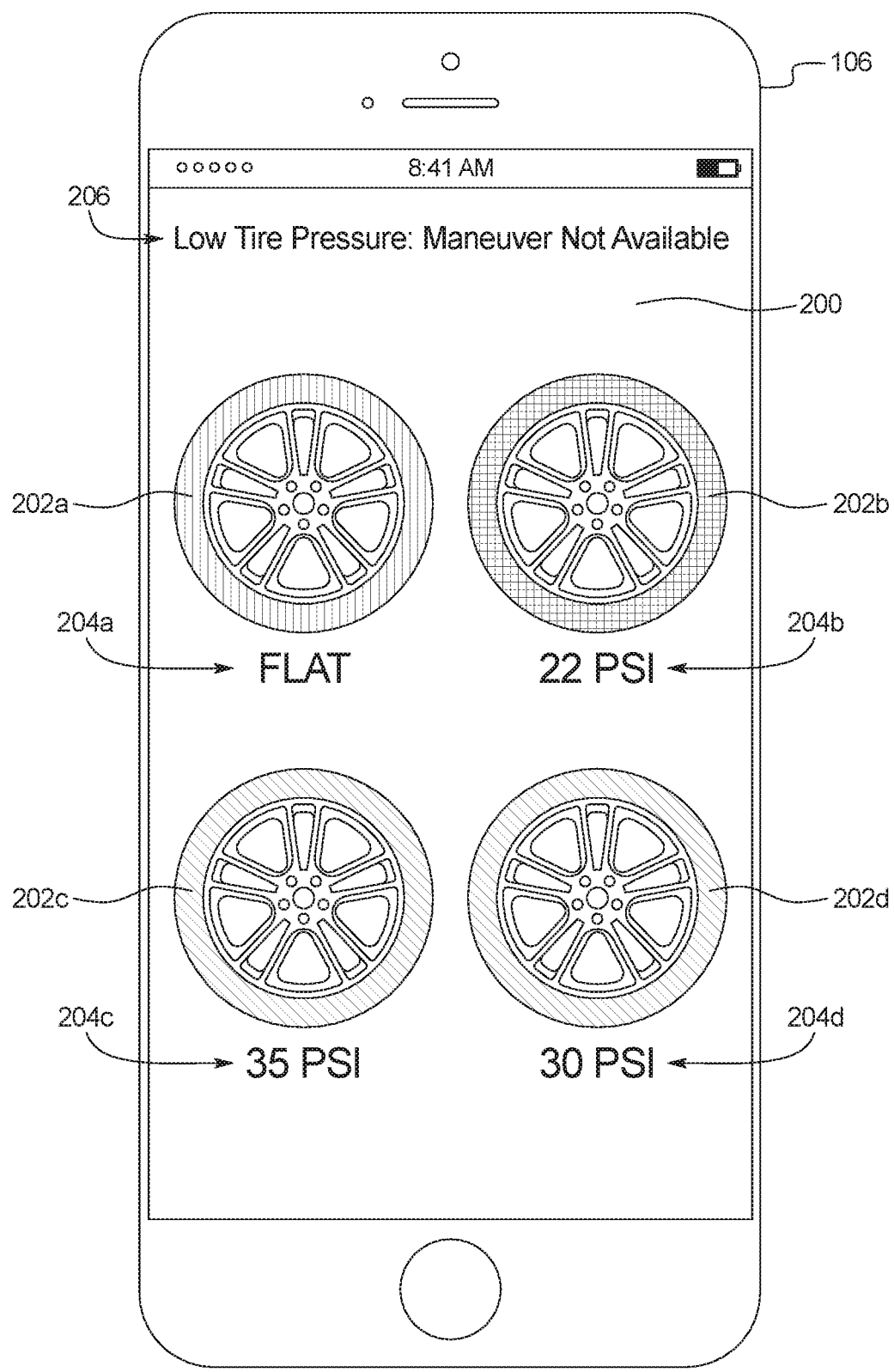
FIG. 2 illustrates an example tire pressure park-assist interface for a user in accordance with the teachings herein.

FIG. 2 illustrates an example interface 200 that is presented via the mobile device 106. As illustrated in FIG. 2, the interface 200 includes the interface 200 includes representations 202 of the tires 114 of the vehicle 100. For example, the interface 200 includes a representation 202a (e.g., a first representation, a first tire representation) of the tire 114a, a representation 202b (e.g., a second representation, a second tire representation) of the tire 114b, a representation 202c (e.g., a third representation, a third tire representation) of the tire 114c, and a representation 202d (e.g., a fourth representation, a fourth tire representation) of the tire 114d.

The interface 200 of the illustrated example includes pressure indicators 204 for the tires 114. For example, the interface 200 includes a pressure indicator 204a (e.g., a first pressure indicator, a first tire pressure indicator) for the tire 114a, a pressure indicator 204b (e.g., a second pressure indicator, a second tire pressure indicator) for the tire 114b, a pressure indicator 204c (e.g., a third pressure indicator, a third tire pressure indicator) for the tire 114c, and a pressure indicator 204d (e.g., a fourth pressure indicator, a first tire pressure indicator) for the tire 114a.

In the illustrated example, the pressure indicators 204 include tire pressure measurements of the tires 114. For example, the pressure indicator 204*a* identifies that the latest tire pressure measurement for the tire 114*a* corresponds with a flat tire, the pressure indicator 204*b* identifies that the latest tire pressure measurement for the tire 114*b* is 22 PSI, the pressure indicator 204*c* identifies that the latest tire pressure measurement for the tire 114*c* is 35 PSI, and the pressure indicator 204*d* identifies that the latest tire pressure measurement for the tire 114*d* is 30 PSI.

Further, the pressure indicators 204 of the illustrated example include status alerts for each the tires 114. For example, the pressure indicators 204 include patterns and/or colors of the representations 202 of the tires 114 to indicate whether each of the tires 114 has a recommended tire pressure, a high tire pressure, a low tire pressure, or a tire pressure corresponding with a flat tire. The park-assist controller 118 determines that a tire has a recommended tire pressure, for example, if the measured tire pressure is within a predefined tire pressure range (e.g., a factory-recommended tire pressure range) that corresponds with the tire and/or the vehicle 100. The park-assist controller 118 determines that a tire has a high tire pressure if the measured tire pressure is greater than a predefined maximum tire pressure (e.g., the factory-recommended maximum tire pressure). The park-assist controller 118 determines that a tire has a low tire pressure if the measured tire pressure is less than a predefined minimum tire pressure (e.g., the factory-recommended minimum tire pressure) and greater than a flat tire threshold. Further, the park-assist controller 118 determines that a tire has a flat tire pressure if the measured tire pressure is less than or equal to the flat tire threshold. In the illustrated example, the status alerts include patterns of the representations 202 of the tires 114. For example, the representation 202*a* includes a first pattern to indicate that the tire 114*a* has a flat tire pressure, the representation 202*b* includes a second pattern to indicate that the tire 114*b* has a low tire pressure, and the representations 202*c*, 202*d* include a third pattern to indicate that the tires 114*c*, 114*d* have recommended tire pressures. In other examples, the status alerts are color-coded to indicate when tires have a flat tire pressure (e.g., red), a low tire pressure (e.g., yellow), and a recommended tire pressure (e.g., green).

As illustrated in FIG. 2, the interface 200 also includes a tire index alert 206. For example, the tire index alert 206 indicates that the park-assist features of the vehicle 100 are unavailable to the user 104 in response to the park-assist controller 118 determining that the tire index is within the low range (e.g., due to the tire 114*a* being flat and/or the tire 114*b* having a low tire pressure). That is, the tire index alert 206 of the illustrated example indicates that the tire index of the vehicle 100 is within the low range. In the illustrated example, the tire index alert 206 includes text stating "Low Tire Pressure: Maneuver Not Available" or "This Maneuver Not Available Due to Tire Pressure" to indicate to the user 104 that the park-assist features are unavailable due to the tire index being within the low range.

Figure 3:
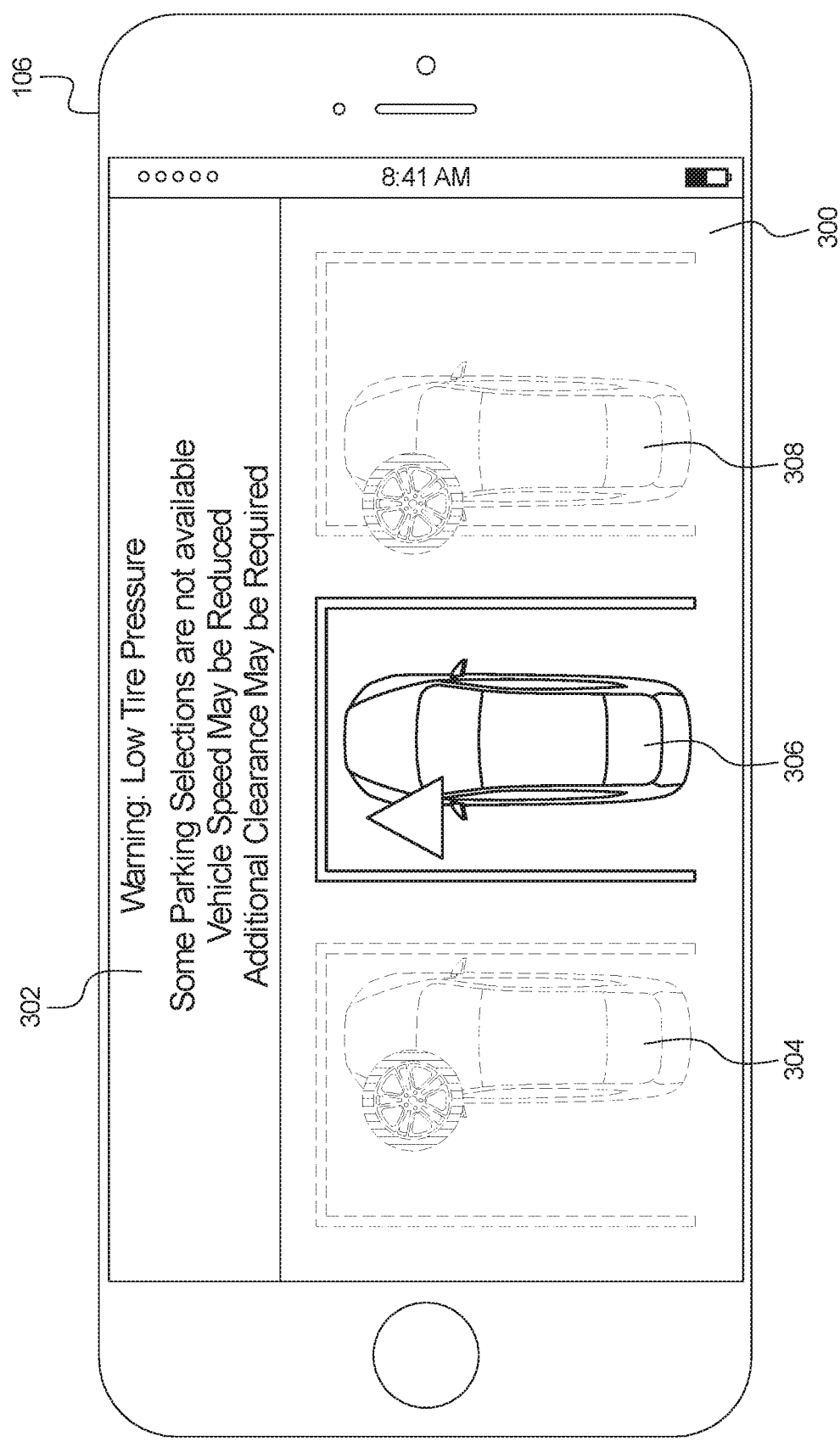
FIG. 3 illustrates another example tire pressure park-assist interface for a user in accordance with the teachings herein.

FIG. 3 illustrates another interface 300 that is presented via the mobile device 106. As illustrated in FIG. 3, the interface 300 includes a tire index alert 302 that indicates the tire index of the vehicle 100 is within the caution range. For example, the tire index alert 302 indicates that some of the park-assist features of the vehicle 100 may be unavailable or adjusted in response to the park-assist controller 118 determining that the tire index is within the caution range (e.g., due to the tire 114*a* being flat, having a low tire pressure, and/or having a high tire pressure). In the illustrated example, the tire index alert 302 warns that one or more of the tires 114 has low tire pressure and indicates that some park-assist features are disabled, a vehicle speed may be reduced during performance of available park-assist features, and additional clearance may be required within the parking spot 102 to enable the vehicle 100 to reliably park within the vehicle 100.

In some examples, the interface 300, which is presented when the tire index is within the caution range, prompts the user 104 to select whether to stop or proceed with performance of the park-assist features. Further, the interface 300 of the illustrated example prompts the user 104 to select a target parking position within the parking spot 102. For example, the interface 300 includes representations 304, 306, 308 of target parking positions within the parking spot 102 for forward-parking maneuvers. The representation 304 (e.g., a first target position) corresponds with a target position at which the vehicle 100 is closer to the right-hand border than the left-hand border of the parking spot 102. The representation 306 (e.g., a second target position) corresponds with a target position at which the vehicle 100 is centrally located between the right-hand border and the left-hand border of the parking spot 102. The representation 308 (e.g., a third target position) corresponds with a target position at which the vehicle 100 is closer to the left-hand border than the right-hand border of the parking spot 102. Additionally or alternatively, the interface 300 is configured to include representations of target parking positions within the parking spot 102 for reverse-parking maneuvers. Further, the interface 300 of the illustrated example causes one or more of the presented target parking positions to be unselectable. For example, a target parking position is unselectable in response to the park-assist controller 118 determining that the low tire pressure and/or high tire pressure of one or more of the tires 114 prevents the park-assist controller 118 from reliably approaching those target parking positions. In the illustrated example, the park-assist controller 118 dims the representations 304, 308 to indicate that the respective target parking positions are prevented from being selected by the user 104. Further, the park-assist controller 118 does not dim the representation to indicate that the respective target parking position is selectable by the user 104.

Further, other examples interfaces presented by the park-assist controller 118 include a tire index alert that indicates the tire index of the vehicle 100 is within a normal operating range. In such examples, the interface may include one or more selectable target parking positions within the parking spot 102 based upon the size and shape of the parking spot 102, the size and shape of the vehicle 100, the location and size of nearby objects, and/or the tire pressure measurements of the tires 114 of the vehicle 100.

In some examples, the park-assist controller 118 records the tire pressure measurements, the alerts that are presented, and/or the options that are selected by the user 104 when the pressure sensors 116 detect low tire pressure and/or high tire pressure for one or more of the tires 114. Such information may be stored on the vehicle 100 (e.g., in memory 512 of FIG. 5) and/or a remote server (e.g., a cloud server) for later use in troubleshooting remote park-assist performance field claims and/or reports. Storing such information may be critical to enabling the service community to identify the specific condition of the vehicle 100 when the alert was presented.

Figure 4:
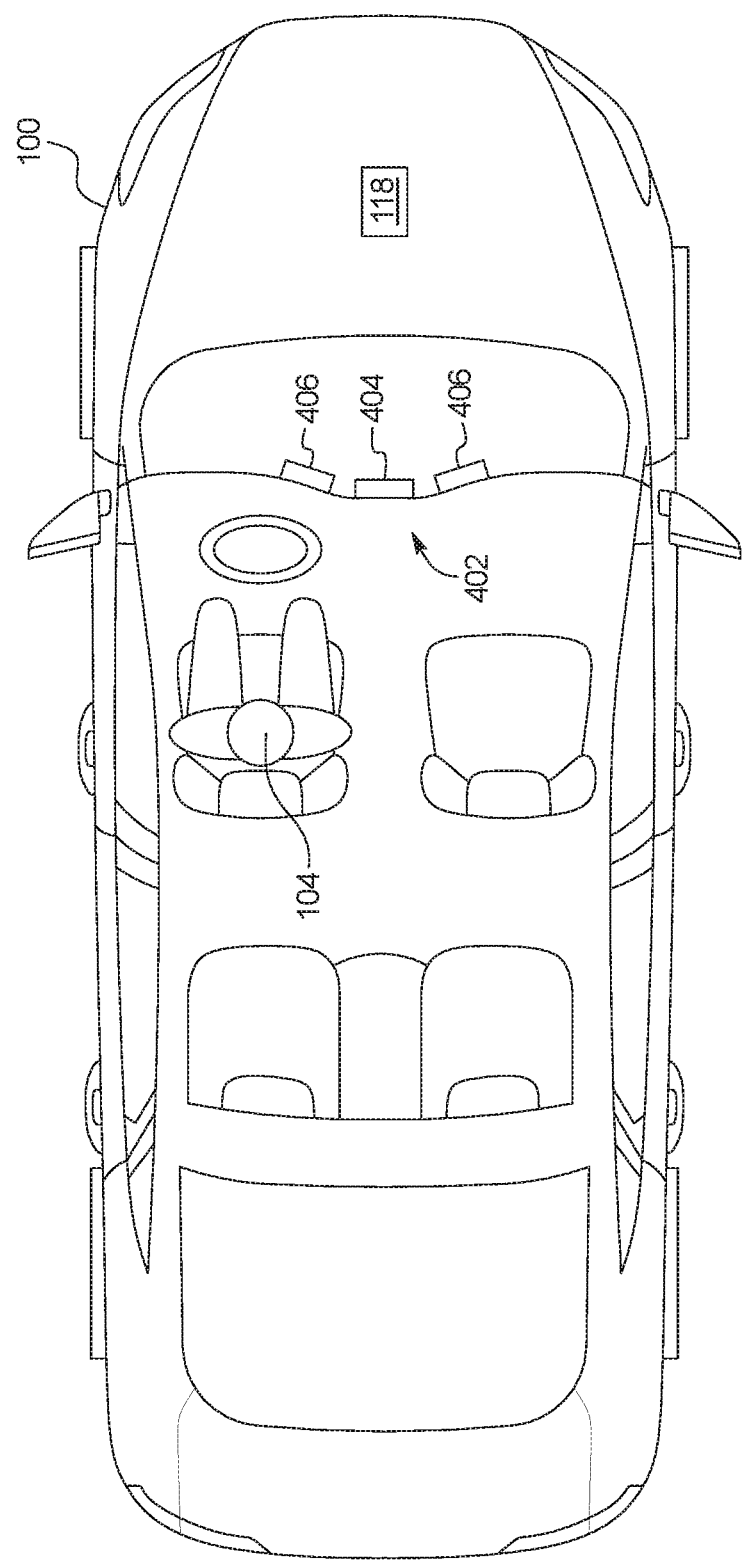
FIG. 4 illustrates another example of the vehicle utilizing park-assist in accordance with the teachings herein.

FIG. 4 illustrates the vehicle 100 when the user 104 is initiating park-assist features from within the vehicle 100. In the illustrated example, the vehicle 100 includes an infotainment head unit 402 that provides an interface between the user 104 and the vehicle 100. The infotainment head unit 402 includes digital and/or analog interfaces (e.g., input devices and output devices) to receive input from and display information for the user(s). The input devices include, for example, a control knob, an instrument panel, a digital camera for image capture and/or visual command recognition, a touchscreen, an audio input device (e.g., cabin microphone), buttons, or a touchpad. The output devices may include instrument cluster outputs (e.g., dials, lighting devices), actuators, a display 404 (e.g., a heads-up display, a center console display such as a liquid crystal display (LCD), an organic light emitting diode (OLED) display, a flat panel display, a solid state display, etc.), and/or speakers 406. The infotainment head unit 402 includes hardware (e.g., a processor or controller, memory, storage, etc.) and software (e.g., an operating system, etc.) for an infotainment system (such as SYNC® and MyFord Touch® by Ford®). Additionally, the display 404 of the infotainment head unit 402 is configured to display the infotainment system to the user 104.

In the illustrated example, the display 404 is configured to present tire pressure and/or park-assist interface(s) to the user 104. For example, the display 404 of the vehicle 100 presents the interface 200 to enable the user 104 to monitor tire pressure of the tires 114 from within a cabin of the vehicle 100. Further, the display 404 of the vehicle 100 presents the interface 300 to enable the user 104 to monitor, select, adjust, and/or initiate park-assist features from within the cabin of the vehicle 100. Additionally or alternatively, the user 104 may utilize the mobile device 106 to initiate park-assist features from within the cabin of the vehicle 100.

Figure 5:
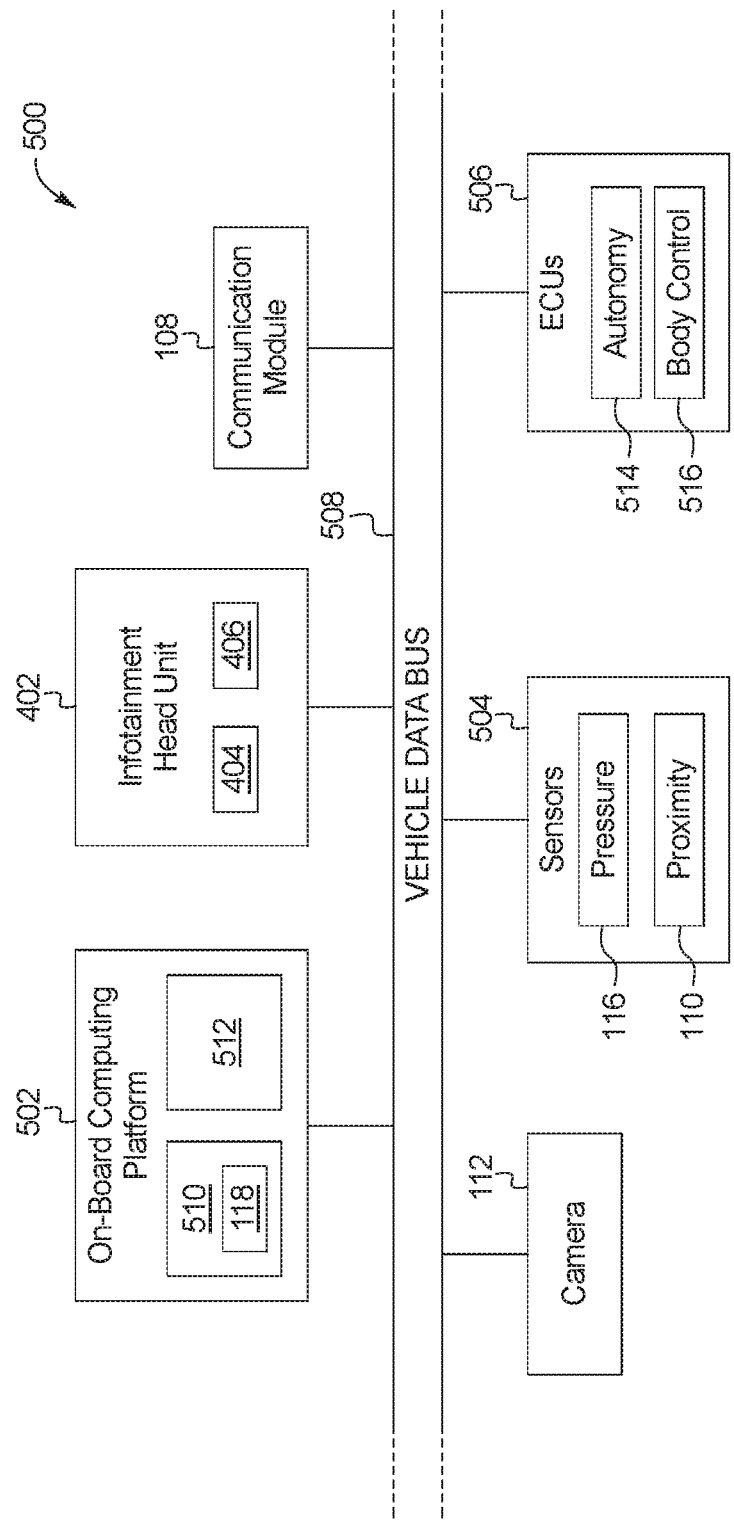
FIG. 5 is a block diagram of electronic components of the vehicle of FIG. 1.

FIG. 5 is a block diagram of electronic components 500 of the vehicle 100. As illustrated in FIG. 5, the electronic components 500 include an on-board computing platform 502, the infotainment head unit 402, the vehicle communication module 108, the cameras 112, sensors 504, electronic control units (ECUs) 506, and a vehicle data bus 508.

The on-board computing platform 502 includes a microcontroller unit, controller or processor 510 and memory 512. In some examples, the processor 510 of the on-board computing platform 502 is structured to include the park-assist controller 118. Alternatively, in some examples, the park-assist controller 118 is incorporated into another electronic control unit (ECU) with its own processor 510 and memory 512. The processor 510 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 512 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 512 includes multiple kinds of memory, particularly volatile memory and non-volatile memory.

The memory 512 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 512, the computer readable medium, and/or within the processor 510 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 504 are arranged in and around the vehicle 100 to monitor properties of the vehicle 100 and/or an environment in which the vehicle 100 is located. One or more of the sensors 504 may be mounted to measure properties around an exterior of the vehicle 100. Additionally or alternatively, one or more of the sensors 504 may be mounted inside a cabin of the vehicle 100 or in a body of the vehicle 100 (e.g., an engine compartment, wheel wells, etc.) to measure properties in an interior of the vehicle 100. For example, the sensors 504 include accelerometers, odometers, tachometers, pitch and yaw sensors, wheel speed sensors, microphones, tire pressure sensors, biometric sensors and/or sensors of any other suitable type. In the illustrated example, the sensors 504 include the pressure sensors 116 that collect tire pressure measurements of the tires 114 and the proximity sensors 110 112 (e.g., radar sensors, LIDAR sensors, ultrasonic sensors, etc.) that detect and locate object(s) near the vehicle 100.

The ECUs 506 monitor and control the subsystems of the vehicle 100. For example, the ECUs 506 are discrete sets of electronics that include their own circuit(s) (e.g., integrated circuits, microprocessors, memory, storage, etc.) and firmware, sensors, actuators, and/or mounting hardware. The ECUs 506 communicate and exchange information via a vehicle data bus (e.g., the vehicle data bus 508). Additionally, the ECUs 506 may communicate properties (e.g., status of the ECUs 506, sensor readings, control state, error and diagnostic codes, etc.) to and/or receive requests from each other. For example, the vehicle 100 may have dozens of the ECUs 506 that are positioned in various locations around the vehicle 100 and are communicatively coupled by the vehicle data bus 508.

In the illustrated example, the ECUs 506 include an autonomy unit 514 and a body control module 516. For example, the autonomy unit 514 controls performance of autonomous and/or semi-autonomous driving maneuvers of the vehicle 100 based upon, at least in part, image(s) and/or video captured by the cameras 112, data collected by the proximity sensors 110, and/or instructions sent by the park-assist controller 118. The body control module 516 controls one or more subsystems throughout the vehicle 100, such as power windows, power locks, an immobilizer system, power mirrors, etc. For example, the body control module 516 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 508 communicatively couples the vehicle communication module 108, the cameras 112, the infotainment head unit 402, the on-board computing platform 502, the sensors 504, and the ECUs 506. In some examples, the vehicle data bus 508 includes one or more data buses. The vehicle data bus 508 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an EthernetTM bus protocol IEEE 802.3 (2002 onwards), etc.

Figure 6:
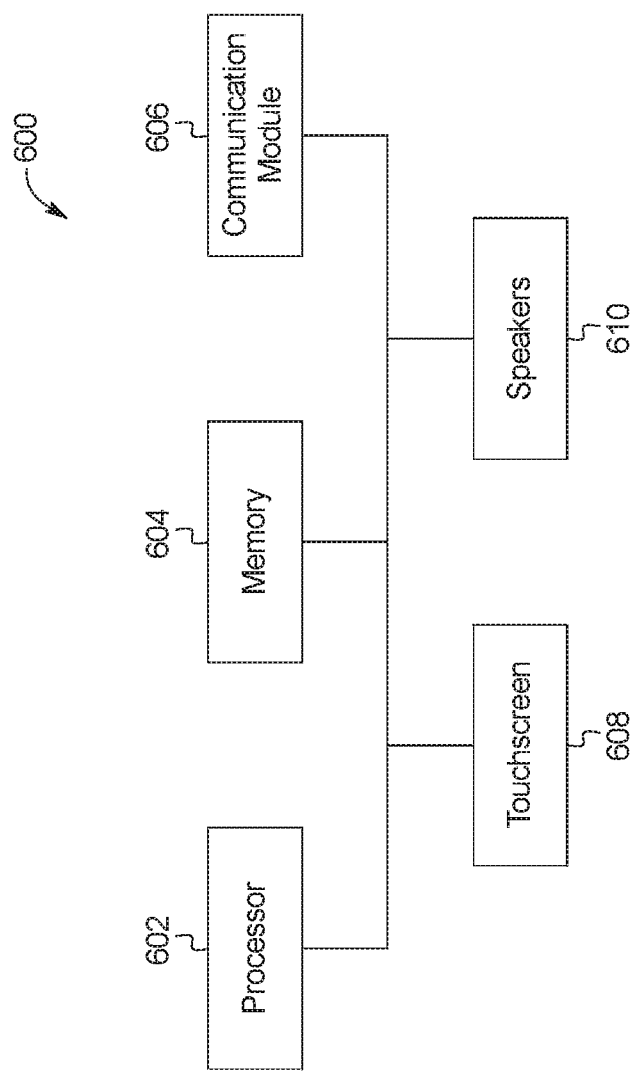
FIG. 6 is a block diagram of electronic components of a mobile device.

FIG. 6 is a block diagram of electronic components 600 of the mobile device 106. As illustrated in FIG. 6, the electronic components 600 include a processor 602, memory 604, a mobile device communication module 606, a touchscreen 608, and speakers 610.

In the illustrated example, the processor 602 is structured to include the park-assist controller 118. The processor 602 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 604 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 604 includes multiple kinds of memory, particularly volatile memory and non-volatile memory.

The memory 604 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 604, the computer readable medium, and/or within the processor 602 during execution of the instructions.

Further, the mobile device communication module 606 includes wired or wireless network interfaces to enable communication with other devices and/or external networks. The external network(s) may be a public network, such as the Internet; a private network, such as an intranet; or combinations thereof, and may utilize a variety of networking protocols now available or later developed including, but not limited to, TCP/IP-based networking protocols. The mobile device communication module 606 also includes hardware (e.g., processors, memory, storage, antenna, etc.) and software to control the wired or wireless network interfaces. For example, the mobile device communication module 606 includes one or more communication controllers for cellular networks, such as Global System for Mobile Communications (GSM), Universal Mobile Telecommunications System (UMTS), Long Term Evolution (LTE), Code Division Multiple Access (CDMA). In the illustrated example, the mobile device communication module 606 includes a wireless personal area network (WPAN) module that is configured to wirelessly communicate with the vehicle communication module 108 of the vehicle 100 via short-range wireless communication protocol(s). In some examples, the mobile device communication module 606 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the mobile device communication module 606 is configured to wirelessly communicate via Wi-Fi®, Near Field Communication (NFC), UWB (Ultra-Wide Band), and/or any other short-range and/or local wireless communication protocol (e.g., IEEE 802.11 a/b/g/n/ac) that enables the mobile device communication module 606 to communicatively couple to the vehicle communication module 108 of the vehicle 100.

The touchscreen 608 of the illustrated example provides an interface (e.g., the interface 200 of FIG. 2, the interface 300 of FIG. 3) between the user 104 and the mobile device 106 to enable the user 104 to initiate remote-park assist features via the mobile device 106. For example, the touchscreen 608 is a resistive touchscreen, a capacitive touchscreen, and/or any other type of touchscreen that displays output information to and tactilely receives input information from the user 104 of the mobile device 106. In some examples, the mobile device 106 also includes other input devices (e.g., buttons, knobs, microphones, etc.) to receive input information from the user 104 and/or output devices, such as the speakers 610, to provide output information to the user 104 of the mobile device 106. Based on input information received from the user 104 via the touchscreen 608 and/or input device, the mobile device communication module 606 of the mobile device 106 wirelessly communicates with the vehicle communication module 108 of the vehicle 100 to initiate motive functions of the vehicle 100 for remote park-assist.

Figure 7:
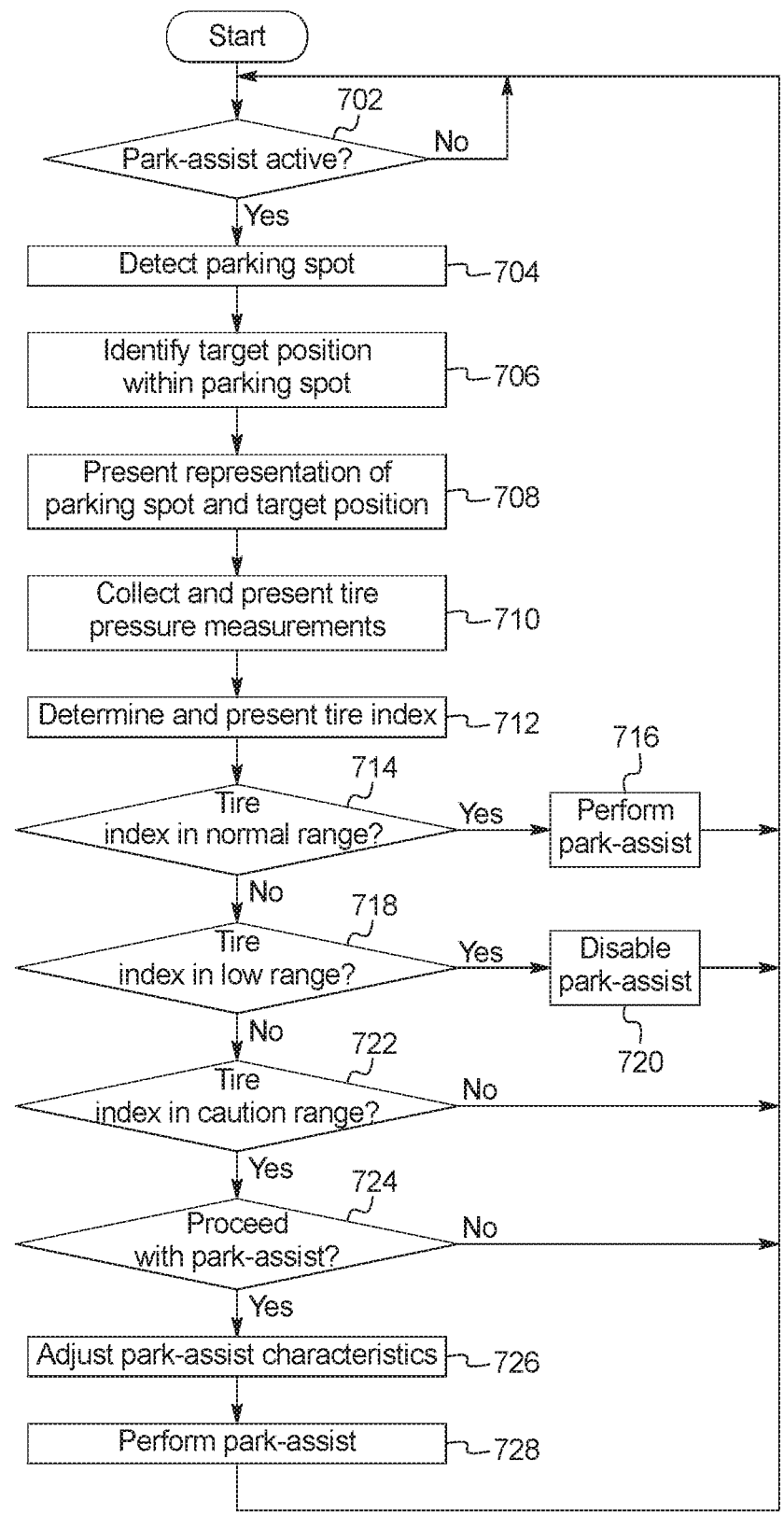
FIG. 7 is a flowchart for performing park-assist features based upon tire pressure measurements in accordance with the teachings herein.

FIG. 7 is a flowchart of an example method 700 to perform park-assist features based upon tire pressure measurements of a vehicle. The flowchart of FIG. 7 is representative of machine readable instructions that are stored in memory (such as the memory 512 of FIG. 5) and include one or more programs which, when executed by a processor (such as the processor 510 of FIG. 5), cause the vehicle 100 to implement the example park-assist controller 118 of FIGS. 1 and 4-5. While the example program is described with reference to the flowchart illustrated in FIG. 7, many other methods of implementing the example park-assist controller 118 may alternatively be used. For example, the order of execution of the blocks may be rearranged, changed, eliminated, and/or combined to perform the method 700. Further, because the method 700 is disclosed in connection with the components of FIGS. 1-6, some functions of those components will not be described in detail below.

Initially, at block 702, the park-assist controller 118 determines whether a park-assist system (e.g., a remote park-assist system) of the vehicle 100 is active. In response to the park-assist controller 118 determining that park-assist is not activated, the method 700 remains at block 702. Otherwise, in response to the park-assist controller 118 determining that park-assist is activated, the method 700 proceeds to block 704.

At block 704, the park-assist controller 118 detects the parking spot 102, for example, based upon data collected by the proximity sensors 110 and/or image(s) and/or video captured by the cameras 112. At block 706, the park-assist controller 118 identifies target parking position(s) within the parking spot 102. For example, the park-assist controller 118 identifies the target parking position(s) based upon characteristics of the vehicle 100, the parking spot 102, and/or a surrounding environment. At block 708, the park-assist controller 118 presents representation(s) of the target parking position(s) within the parking spot 102 for the user 104. For example, the park-assist controller 118 presents an interface (e.g., the interface 300) that includes the representation(s) via the display 404 of the vehicle 100 and/or the touchscreen 608 of the mobile device 106. In some examples, the interface enables the user 104 to select one of the target parking position(s) within the parking 102.

Further, at block 710, the park-assist controller 118 collects tire pressure measurements from the pressure sensors 116 of the tires 114 and presents the tire pressure measurements to the user 104. For example, the park-assist controller 118 presents an interface (e.g., the interface 200) that includes the tire pressure measurements and/or tire pressure indicators via the display 404 of the vehicle 100 and/or the touchscreen 608 of the mobile device 106. At block 712, the park-assist controller 118 determines the tire index of the vehicle based on the pressure measurements of the tires 114 collected by the pressure sensors 116.

At block 714, the park-assist controller 118 determines whether the tire index of the vehicle 100 is within the normal operating range. In response to the park-assist controller 118 determining that the tire index is not within the normal operating range, the method 700 proceeds to block 718. Otherwise, in response to the park-assist controller 118 determining that the tire index is within the normal operating range, the method 700 proceeds to block 716 at which the park-assist controller 118 enables the vehicle 100 to perform park-assist features upon being initiated by the user 104. In some examples, the park-assist controller 118 presents a tire index alert indicating that the tire index of the vehicle 100 is within the normal operating range and/or the park-assist features are available. Further, in some examples, the park-assist controller 118 presents selectable park-assist options (e.g., a target position within the parking spot 102) to the user 104 via an interface to enable the user 104 to initiate performance of the park-assist features by the vehicle 100.

At block 718, the park-assist controller 118 determines whether the tire index of the vehicle 100 is within the low range. In response to the park-assist controller 118 determining that the tire index is not within the low range, the method 700 proceeds to block 722. Otherwise, in response to the park-assist controller 118 determining that the tire index is within the low range, the method 700 proceeds to block 720 at which the park-assist controller 118 prevents the vehicle 100 from performing park-assist features. In some examples, the park-assist controller 118 presents an interface (e.g., the interface 200 of FIG. 2) including a tire index alert that indicates the tire index of the vehicle 100 is within the low range and/or the park-assist features are disabled.

At block 722, the park-assist controller 118 determines whether the tire index of the vehicle 100 is within the caution range. In response to the park-assist controller 118 determining that the tire index is not within the caution range, the method 700 returns to block 702. Otherwise, in response to the park-assist controller 118 determining that the tire index is within the caution range, the method 700 proceeds to block 724 at which the park-assist controller 118 determines whether to proceed with the park-assist features. In some examples, the park-assist controller 118 presents an interface that enables the user 104 to select whether to stop or proceed with performance of the park-assist features. Further, in some examples, the park-assist controller 118 presents a tire index alert indicating that the tire index of the vehicle 100 is within the caution range and/or some park-assist features of the vehicle 100 are available and/or unavailable. Additionally or alternatively, the park-assist controller 118 presents selectable park-assist options (e.g., a target position within the parking spot 102) that are determined, at least in part, based upon low pressure measurement(s) of one or more of the tires 114. In response to the park-assist controller 118 determining that the park-assist features are not to be performed, the method 700 returns to block 702. Otherwise, in response to the park-assist controller 118 determining that the park-assist features are to be performed, the method 700 proceeds to block 726.

At block 726, the park-assist controller 118 adjusts characteristics of the park-assist features to be performed based upon low pressure measurement(s) of one or more of the tires 114. For example, to compensate for low pressure measurement(s) of one or more of the tires 114, the park-assist controller 118 (i) adjusts a target position and/or orientation of the vehicle 100 within the parking spot 102, (ii) adjusts a travel path of the vehicle 100 into the parking spot 102, (iii) increases a buffer zone within the parking spot 102, (iv) decreases a vehicle speed during performance of the park-assist motive functions, and/or (v) adjusts controller gains (e.g., PID controller gains) utilized to perform the park-assist features. Further, at block 728, the vehicle 100 performs the park-assist features based upon the adjustments made at block 726.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," and a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   tires;
   pressure sensors; and
   a controller to:
      identify a target position within a parking spot for park-assist;
      determine a tire index based on tire pressure measurements;
      identify whether the tire index is within a low range, a caution range, or a normal operating range, wherein the tire index is within the low range when one or more of the tires has a tire pressure less than or equal to a flat tire threshold, wherein the tire index is within the normal operating range when each of the tires has a tire pressure within a factory-recommended tire pressure range, wherein the tire index is within the caution range when the one or more of the tires has a tire pressure that is both above the factory-recommended tire pressure range and outside of the factory-recommended tire pressure range; and responsive to the tire index being within the caution range;
adjust the target position to facilitate access to one of the tires that has a tire pressure outside of the factory-recommended tire pressure range; and
cause a park-assist interface to prompt a user to select whether to stop or proceed with the park-assist.

2. The vehicle of claim 1, wherein the controller disables the park-assist responsive to identifying that the tire index is within the low range.

3. The vehicle of claim 1, wherein the controller enables the park-assist responsive to identifying that the tire index is within the normal operating range.

4. The vehicle of claim 1, wherein the controller reduces the tire index in response to detecting that one or more of the tires has a low tire pressure or a high tire pressure.

5. The vehicle of claim 4, wherein the controller further reduces the tire index in response to detecting that one or more of the tires is flat.

6. The vehicle of claim 4, wherein the controller further reduces the tire index in response to detecting that the one or more of the tires having the low tire pressure or the high tire pressure is a steering tire.

7. The vehicle of claim 1, wherein the controller reduces the tire index in response to detecting that one of the tires has a lower tire pressure than the other of the tires.

8. The vehicle of claim 1, further including at least one of a sensor and a camera, wherein the controller identifies the parking spot and the target position within the parking spot based on at least one of data collected by the sensor and an image captured by the camera.

9. The vehicle of claim 1, further including a communication module configured to wirelessly communicate with a mobile device for remote park-assist.

10. The vehicle of claim 1, further including a display that is configured to present a park-assist interface.

11. The vehicle of claim 1, wherein a park-assist interface includes a tire index alert that indicates whether the tire index is within the low range, the caution range, or the normal operating range.

12. The vehicle of claim 1, wherein a park-assist interface presents the tire pressure measurements of the tires.

13. The vehicle of claim 1, wherein a park-assist interface presents a representation of the parking spot and the target position within the parking spot.

14. A vehicle comprising:
tires;
pressure sensors; and
a controller to:
identify a target position within a parking spot for park-assist;
determine a tire index based on tire pressure measurements;
identify whether the tire index is within a low range, a caution range, or a normal operating range, wherein the tire index is within the low range when one or more of the tires has a tire pressure less than or equal to a flat tire threshold, wherein the tire index is within the normal operating range when each of the tires has a tire pressure within a factory-recommended tire pressure range, wherein the tire index is within the caution range when the one or more of the tires has a tire pressure that is both above the factory-recommended tire pressure range and outside of the factory-recommended tire pressure range;
adjust, responsive to the tire index being within the caution range, the target position to facilitate access to one of the tires that has a tire pressure outside of the factory-recommended tire pressure range; and
to compensate for a low tire pressure or a high tire pressure of one or more of the tires upon identifying that the tire index is within the caution range, at least one of increase a buffer zone within the parking spot, decrease a vehicle speed for the park-assist, and adjust PID controller gains utilized to perform the park-assist.

15. The vehicle of claim 14, wherein, when the tire index is within the caution range, a park-assist interface prompts a user to select whether to stop or proceed with the park-assist.

16. The vehicle of claim 14, wherein, upon identifying that the tire index is within the caution range, the controller stops performing the park-assist responsive to determining that a vehicle trajectory will enter the buffer zone.

17. A method comprising:
identifying, via a processor, a target position within a parking spot for park-assist;
collecting tire pressure measurements via pressure sensors;
determining a tire index based on the tire pressure measurements;
identifying whether the tire index is within a low range, a caution range, or a normal operating range, wherein the tire index is within the low range when one or more of the tires has a tire pressure less than or equal to a flat tire threshold, wherein the tire index is within the normal operating range when each of the tires has a tire pressure within a factory-recommended tire pressure range, wherein the tire index is within the caution range when the one or more of the tires has a tire pressure that is both above the factory-recommended tire pressure range and outside of the factory-recommended tire pressure range; and
prompting, via a park-assist interface, a user to select whether to stop or proceed with the park-assist when the tire index is within the caution range.

18. The method of claim 17, further including disabling, via the processor, the park-assist responsive to identifying that the tire index is within the low range.

19. The method of claim 17, further including enabling, via the processor, the park-assist responsive to identifying that the tire index is within the normal operating range.

* * * * *